US012688955B2

(12) United States Patent
Schlipf

(10) Patent No.: US 12,688,955 B2
(45) Date of Patent: Jul. 21, 2026

(54) PROCESS FOR THE MANUFACTURE OF A MINERAL-INSULATED SOCKET

(71) Applicant: Türk & Hillinger GmbH, Tuttlingen (DE)

(72) Inventor: Andreas Schlipf, Tuttlingen (DE)

(73) Assignee: TÜRK & HILLINGER GMBH, Tuttlingen (DE)

( * ) Notice: Subject to any disclaimer, the term of this patent is extended or adjusted under 35 U.S.C. 154(b) by 778 days.

(21) Appl. No.: 17/970,419

(22) Filed: Oct. 20, 2022

(65) Prior Publication Data

US 2023/0133066 A1 May 4, 2023

(30) Foreign Application Priority Data

Nov. 3, 2021 (DE) ..................... 10 2021 128 646.8

(51) Int. Cl.
*H01B 19/00* (2006.01)
*H01B 17/26* (2006.01)
*H01B 17/60* (2006.01)

(52) U.S. Cl.
CPC ............. *H01B 19/00* (2013.01); *H01B 17/26* (2013.01); *H01B 17/60* (2013.01)

(58) Field of Classification Search
CPC ........ H01B 19/00; H01B 17/26; H01B 17/60; F01N 3/28; F01N 2240/16; F01N 3/2013
See application file for complete search history.

(56) References Cited

U.S. PATENT DOCUMENTS 6,025,578 A * 2/2000 Bruck .................... F01N 3/2026 422/177
6,031,213 A * 2/2000 Hashimoto ........... F01N 3/2026 422/174
(Continued)

FOREIGN PATENT DOCUMENTS

CN 108661762 A * 10/2018 ............... C23C 8/24
DE 102012110098 A1 * 4/2014 ........... F01N 3/2026
(Continued)

OTHER PUBLICATIONS

Aksenov and Kunkin, Metal flow control at processes of cold axial rotary forging, Advances in Mechanical Engineering: Selected Contributions from the Conference "Modern Engineering: Science and Education", Springer International Publishing, 2016. (Year: 2016).*
(Continued)

*Primary Examiner* — Thomas J Hong
*Assistant Examiner* — Jose K Abraham
(74) *Attorney, Agent, or Firm* — Panitch Schwarze Belisario & Nadel LLP

(57) ABSTRACT

Provided is a process for the manufacture of a mineral-insulated socket, especially as a module for the manufacture of an electrical feedthrough and especially for use in an exhaust gas duct of a motor vehicle. The mineral-insulated socket has a metallic inner part arranged in a metallic outer pipe and electrically insulated from this metallic outer pipe by an electrically insulating, mineral material. In a process, the metallic inner part, the electrically insulating material, and the outer pipe are compressed to form a composite and in a subsequent step, the mineral-insulated socket is produced by removing at least one complete section of the compressed composite.

8 Claims, 6 Drawing Sheets

(56) References Cited

U.S. PATENT DOCUMENTS

| | | | | |
|---|---|---|---|---|
| 2001/0011449 | A1* | 8/2001 | Pellegrino | B01D 53/8653<br>55/486 |
| 2005/0042151 | A1* | 2/2005 | Alward | D04H 1/4209<br>422/177 |
| 2014/0248187 | A1* | 9/2014 | Wikaryasz | F01N 13/1805<br>422/168 |
| 2020/0384676 | A1* | 12/2020 | Crawford | C04B 26/02 |
| 2021/0131328 | A1* | 5/2021 | Uysal | F01N 13/1844 |
| 2023/0054762 | A1* | 2/2023 | Muznik | F01N 13/18 |

FOREIGN PATENT DOCUMENTS

| | | | | |
|---|---|---|---|---|
| DE | 102012110098 | B4 * | 3/2021 | F01N 3/2026 |
| EP | 3851648 | A1 * | 7/2021 | H01B 17/308 |
| WO | WO-2005121519 | A1 * | 12/2005 | F01N 3/28 |

OTHER PUBLICATIONS

Office Action issued Aug. 23, 2022 in German Patent Application No. 10 2021 128 646.8.

* cited by examiner

PROCESS FOR THE MANUFACTURE OF A MINERAL-INSULATED SOCKET

CROSS-REFERENCE TO RELATED APPLICATIONS

This application claims priority under 35 U.S.C. § 119(b) to German Patent Application No. 10 2021 128 646.8, filed on Nov. 3, 2021, the disclosure of which is incorporated herein by reference in its entirety.

BACKGROUND OF THE INVENTION

The preferred invention relates to the manufacture of a mineral-insulated socket, especially as a module for the manufacture of an electrical feedthrough. Mineral-insulated sockets are needed especially when an electrical conductor is to be routed through an electrically conductive material without forming an electrical contact between the electrical conductor and the electrically conductive material. They typically have a metallic inner part, an insulating material that has an electrically insulating effect, and a metallic jacket by means of which the connection to the electrically conductive material, through which the conductor is to be routed, can be produced.

There is a line of applications, for example, in the automotive industry, in which such sockets are exposed to very high loads. If one considers, for example, an electrical exhaust gas heating system for a catalytic converter in a motor vehicle, an electrical feedthrough, that is, a conductor for supplying power to the exhaust gas heating system must be routed into a socket in a way that is insulated from the wall of the pipe carrying the exhaust gas.

Such a catalytic converter heating system is often suspended in the exhaust gas pipe so that it is insulated from this pipe, which is realized partially by means of insulating pins in the interior of the exhaust gas pipe, but also at least partially by producing a mechanical connection of the electrical feedthrough conductor projecting into the interior of the pipe, especially through welding or soldering.

In addition, the electrical conductor that is routed through the socket often has a thread on its connection side for securing an electrical connection by pressing defined contact surfaces against each other. When this connection is tightened and loosened, significant torsion forces are also produced in addition to compression and tension.

In this use case, the insulated socket must be able to withstand, on one hand, high long-term and continuous temperature loads, but also, on the other hand, high vibration loads, as well as impacts and knocks, during the operation of the vehicle. For this reason, it is very important that the insulated socket has high mechanical stability and tensile strength and high load-bearing capacity with respect to torsion. At the same time, the exhaust gas leakage rate through the overall feedthrough and thus especially through the socket must be as low as possible. All these requirements must be coordinated with the installation space requirements that limit the length of the insulated socket.

Previously, especially for applications in the exhaust gas duct, such insulated sockets were usually manufactured as integral parts of the electrical feedthrough and not as a separate module used for the manufacture of the feedthrough.

For manufacturing such electrical feedthroughs with an integrated insulated socket, it is known from the state of the art to provide the electrical conductor, which, in many applications, must be made from an expensive material, e.g., NiCr8020, as a semifinished part formed into its desired shape, for example, through turning, milling, and/or thread rolling, and then to slide on an insulating pipe, which is typically made of a mineral, ceramic insulating material, in particular, from a porous MgO body made from, e.g., C820, and to then mount this arrangement in the interior of an outer pipe, which can be made, e.g., from stainless steel. After this arrangement made of the electrical conductor, insulating pipe, and outer pipe is assembled, it is compressed, which reduces its cross section, so that the electrical feedthrough is produced.

Practice has shown that this type of manufacture of electrical feedthroughs brings with it a series of problems and it is associated with rather high costs and effort, because each electrical feedthrough must be individually mounted and compressed. The degree of compression that is achieved varies namely such that it decreases in the direction toward the ends of the outer pipe of the electrical feedthrough. This has the result that these areas have a stabilizing effect only to a certain extent against mechanical loads, especially in the form of impacts and knocks, tension, torsion, or vibration; in addition, the likelihood that exhaust gas can escape increases.

This is particularly relevant because the length of the outer pipe is often very small usually due to structural specifications with respect to the installation space requirements.

It can further happen that insulating material can break off from end surfaces of the compressed insulating pipe. This further reduces the surface area between the conductor and insulating material, as well as the insulating material and outer pipe, so that the feedthrough is even less resistant to impacts and knocks, compression, tension, and torsion, and the likelihood that exhaust gas can escape.

BRIEF SUMMARY OF THE INVENTION

These problems can be reduced, but not completely avoided, by placing silicone washers, rubber tubes, or similar parts on end surfaces for the compression process. These parts generate a certain axial counter pressure during the compression process, which increases the compression in the edge area and reduces the breakage of the insulating material.

Another procedure known from German Patent No. DE 10 2012 110 098 B4 consists in that, for the electrical feedthrough, the inner conductor, insulating material, and outer pipe are provided as a compressed, preassembled bar stock material, and from this bar stock material, the exposed conductor sections of the inner jacket are machined as contacts and provided with the desired outer contours, for example, by cutting a thread into the inner conductor machined from the bar stock material. In this way, the problem of spacing tolerances of the inner conductor, which occur in the procedure mentioned first, can be reliably solved. However, reliability is achieved with a relatively high consumption of materials. Even for electrical feedthroughs, in which the contact section must have a long construction, large parts of the outer jacket must be simply removed and converted into swarf or chips. Apart from the outer jacket, the insulating material, which is often magnesium oxide, must also be removed, which consequently soils the workspace of the machine being used to process the inner conductor, leading to abrasive effects and wear effects on this machine, which can severely shorten the service life of the machine. All this makes the manufacture of such electrical feedthroughs more expensive.

The task of the preferred invention is therefore to provide an improved process for the manufacture of a mineral-insulated socket, in particular as a module for the manufacture of an electrical feedthrough, for example, for use in an exhaust gas duct of a motor vehicle, which features high mechanical stability and low leakage rates.

This task is solved by a process with the features described herein. Advantageous designs of the process are the subject matter of the present disclosure.

The process according to the preferred invention is used for the manufacture of a mineral-insulated socket, in particular, as a module for the manufacture of an electrical feedthrough and, in particular, for the use in an exhaust gas duct of a motor vehicle.

The mineral-insulated socket has a metallic inner part arranged in a metallic outer pipe and electrically insulated from this outer pipe by an electrically insulating, mineral material. As the electrically insulating, mineral material, magnesium oxide, which can be used as a molded body or as powder or granulate before the compression, or also C820, is especially preferred.

In the process, in a first step, the metallic inner part, the electrically insulating material, and the outer pipe can be compressed to form a composite.

In particular, the electrically insulating mineral material is then highly compressed, has a residual porosity—even if low—and is not densely sintered.

In a subsequent step, the socket is then produced by the removal of a complete section of the compressed composite. The removal can be realized, for example, by cutting, sawing, milling, lasing, or water jet cutting. A complete section of the compressed composite is then removed when, in this section, all components of the composite have been removed; this is not the case, e.g., if only one section of the outer pipe, the electrically insulating material, or the metallic inner part is removed.

For the sake of completeness, it should be noted that a mineral-insulated socket that has sections in which individual components of the composite have been removed nevertheless can be produced according to the invention if, in the manufacturing, also a complete section of the compressed composite was removed.

In one preferred variant of the process according to the invention, the individual socket is separated from a compressed composite that is provided as bar stock material and is made from an outer pipe, whose interior is passed through by a metallic inner part, which is surrounded by an insulating material in the interior of the outer pipe.

Here, "as bar stock material" means that the material is provided in a length that exceeds the length of the mineral-insulated socket to be produced, so that multiple mineral-insulated sockets can be produced from one bar of the material through successive cuts.

Also falling under the process according to the preferred invention is if an outer pipe, electrically insulating mineral material, and metallic inner conductor are provided in a length that exceeds the planned length of the mineral-insulated socket, e.g., by 10 mm or 20 mm, and a complete end section of the compressed composite is removed from one side or both sides after the compression process to form the compressed composite.

The compression can be realized, on one hand, such that the individual components are pressed together, but, on the other hand, can also be realized, e.g., through rolling, hammering, or drawing from a larger cross section.

It is especially preferred if the materials in use and/or the procedure for the compression are selected so that the density of the compressed mineral insulating material between the outer pipe and metallic inner part is >2.5 g/ccm, in particular, >2.8 g/ccm and especially preferred >3 g/ccm, and/or the reduction in diameter when the outer pipe is compressed is a multiple (3, 5, 10 times or even more) of the reduction in diameter of the inner conductor.

It has been shown that both procedures are associated with multiple advantages:

In the process according to the invention, end sections that lead to a non-uniform and, in particular, lower compression, no longer have negative effects on the properties of the mineral-insulated socket, especially if the end sections of the bar stock material are optionally each separated with the use of a new bar. The mineral-insulated sockets produced according to the invention are also compressed uniformly more strongly over their length than before and problems with insulating material breaking off the ends can be effectively avoided. Accordingly, mineral-insulated sockets produced in this way are distinguished in that the section where the MgO breakout between the inner pipe and outer pipe is located is less than 1 mm; it can also be reduced to less than 0.25 mm.

This leads to an improvement of the resistance of the resulting mineral-insulated socket against mechanical loads, in particular, in the form of tension, torsion, or vibration, even if nominally the same pressure is used in the compression process as in the previously known manufacturing process.

In a first embodiment of the process, the metallic inner part used in the manufacture of the compressed composite is solid. Any other components of a feedthrough that is produced using such a socket can then be simply attached, in particular, welded or soldered, on the end side to the metallic inner part. Alternatively, openings can be formed from one or both end sides into the solid metallic inner part of the socket, so that such a socket can be equipped with a wide variety of different components of a feedthrough and can thus represent a module that can be used universally for many kinds of feedthroughs.

In an alternative embodiment of the process, the metallic inner part used in the manufacture of the compressed composite is a pipe. This can be advantageous, especially if a contact element is to be pushed through the socket to produce an electrical feedthrough.

To make sure in this embodiment that the pipe withstands the pressing force during the compression process, the pipe used in the manufacture of the compressed composite can be filled with a core during the compression process, for example, with a bar made from a more economical material or with a calibration mandrel. The core is removed after the compression of the bar stock material. In this way, mineral-insulated sockets can be produced that are distinguished in that the wall thickness of the outer pipe is thicker than the wall thickness of the tubular metallic inner part, in particular, at least 2× as thick and especially preferred, at least 3× as thick and/or the insulating layer is thicker in wall thickness than the tubular metallic inner part, in particular, more than 2× or 3× as thick.

Especially for providing the mounting of additional components of the electrical feedthrough to be made from the mineral-insulated socket, it can be useful if the process further has the step of forming at least one opening in the metallic inner part. In particular, metallic inner parts with an opening can form a bearing section for contact elements of an electrical feedthrough produced using such a mineral-insulated socket.

This opening can be formed in the metallic inner part before the removal step or can be formed in the metallic inner part after the removal step.

It can be formed such that the opening passes through the metallic inner part completely or can be formed in the metallic inner part as a blind hole.

If the opening is formed after the removal step, an additional opening is formed in the metallic inner part from the other side, such that a separating wall remains in the metallic inner part between the opening and the additional opening. In this case, it is guaranteed that the leakage rate is determined just from the leakage rate of the compressed electrical insulating material.

It is advantageous if the opening is formed concentric to the pipe center axis of the outer pipe. This ensures that a displacement of the metallic inner part does not have an effect on the position of the contact elements of the electrical feedthrough produced with such a mineral-insulated socket during the compression process to form the composite.

The later formation of an opening in the already compressed composite has the result that a tight diameter tolerance of less than 0.1 mm, in particular, less than 0.05 mm, and especially preferred less than 0.03 mm can be achieved.

In one advantageous embodiment of the process, parts of the outer pipe of the mineral-insulated socket are removed so that the outer pipe has multiple outer pipe sections electrically insulated from each other.

This measure significantly increases the creep resistance by increasing the air gap and leakage distances or, in general, the insulating clearance is achieved, while simultaneously the structural integrity of the socket is guaranteed over nearly its entire length.

BRIEF DESCRIPTION OF THE SEVERAL VIEWS OF THE DRAWING

The foregoing summary, as well as the following detailed description of the preferred invention, will be better understood when read in conjunction with the appended drawings. For the purpose of illustrating the preferred invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1A:
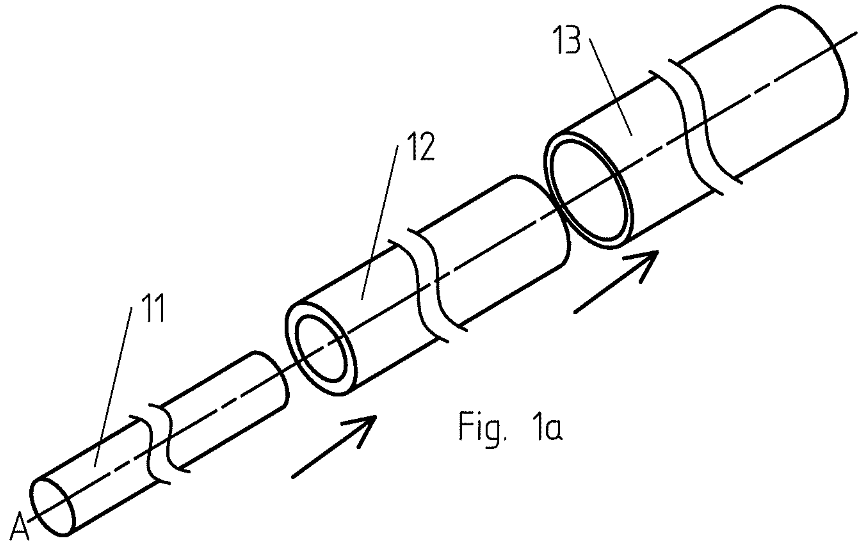
FIG. 1*a* is a side perspective, partial fragmentary view of a step of a first embodiment of a process for the manufacture of a mineral-insulated socket.
Figure 1B:
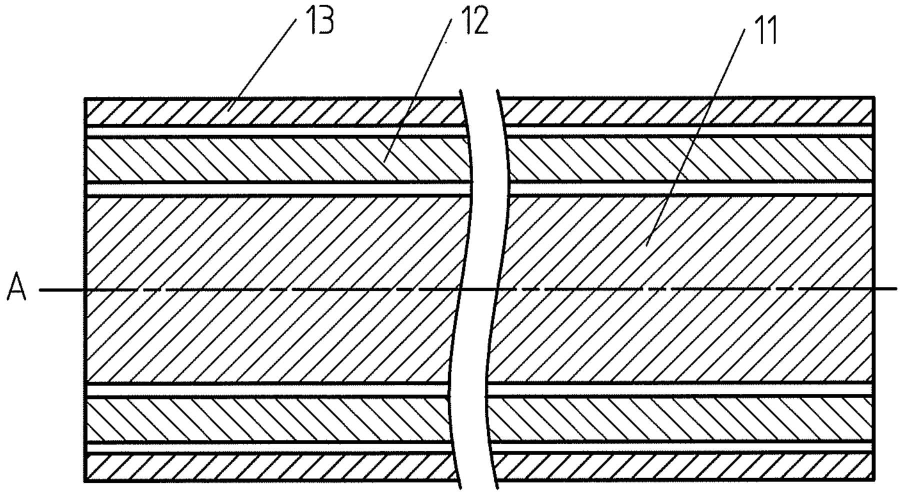
FIG. 1*b* is a cross-sectional view taken along a center axis A of the mineral insulated socket of FIG. 1 in an intermediate stage after the step from FIG. 1*a*.

FIG. 1*a* shows a step of a first embodiment of the process for the manufacture of a mineral-insulated socket 100. Here, a metallic outer pipe 13, an electrically insulating material 12, which is provided here as a tubular molded body made from magnesium oxide, whose outer diameter is adapted to the inner diameter of the metallic outer pipe 13, and a bar-shaped metallic inner part 11, which can be made, e.g., from NiCr8020 and whose outer diameter is adapted to the inner diameter of the tubular molded body made from magnesium oxide, are pushed one into the other, so that the intermediate stage shown in FIG. 1*b* is produced.

Figure 1C:
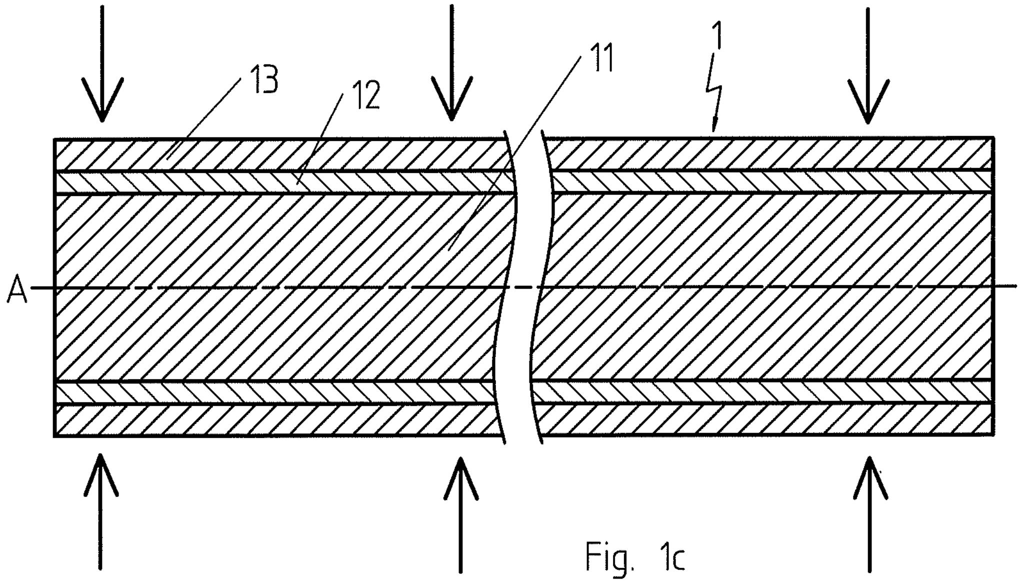
FIG. 1*c* is a cross-sectional view taken along the center axis A of the mineral insulated socket of FIG. 1 in a second intermediate stage after the compression of the first intermediate stage of FIG. 1*b*.

Through the compression process, which is indicated by the arrows in FIG. 1*c*, the further intermediate stage shown in FIG. 1*c* is produced, namely the compressed bar stock material 1, in which, in particular, the position of the components of the bar stock material are fixed and the porosity of the electrical insulating material 13—as can be easily seen in the significantly reduced thickness of this layer in the sectional representation of FIG. 1*c*— is significantly reduced, so that sufficient tolerances with respect to mechanical loads and low leakage rate are guaranteed.

Figure 1D:
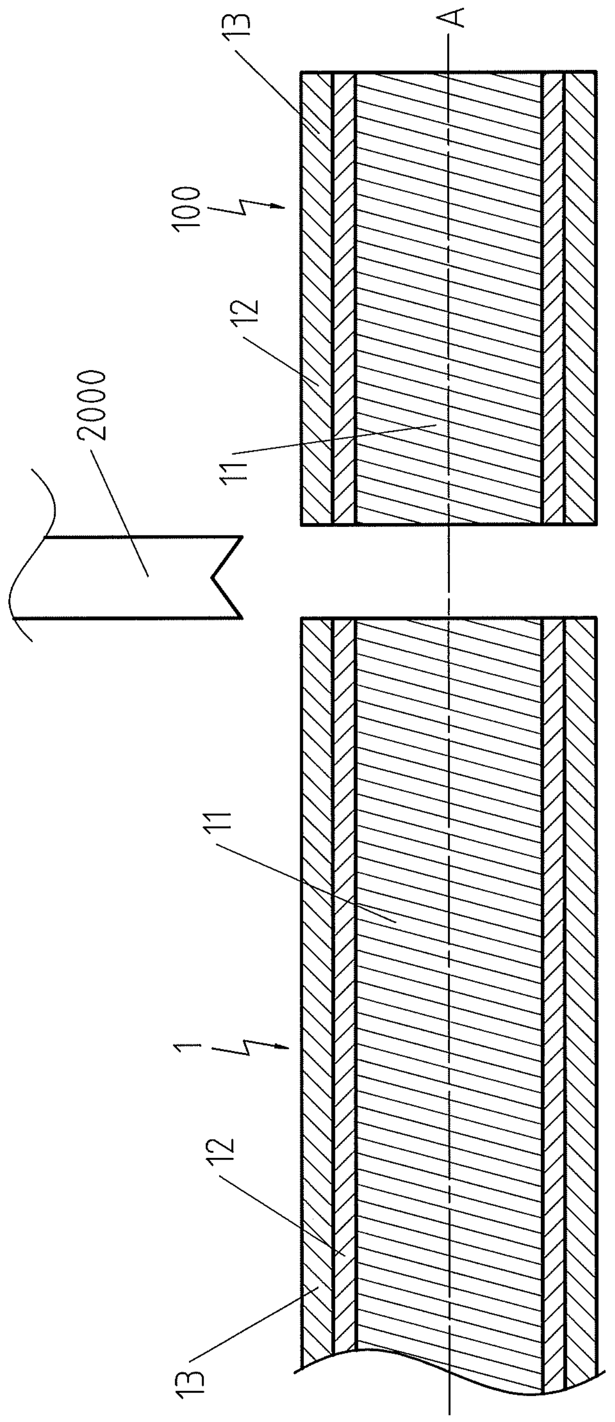
FIG. 1*d* is a cross-sectional view taken along the center axis A of the mineral insulated socket of FIG. 1 after completion of the mineral-insulated socket in a first variant of the first embodiment of the process.

From the bar stock material 1, as shown in FIG. 1*d*, the mineral-insulated socket 100 can then be produced in that the mineral-insulated socket 100 is cut with the tool 2000.

Figure 4A:
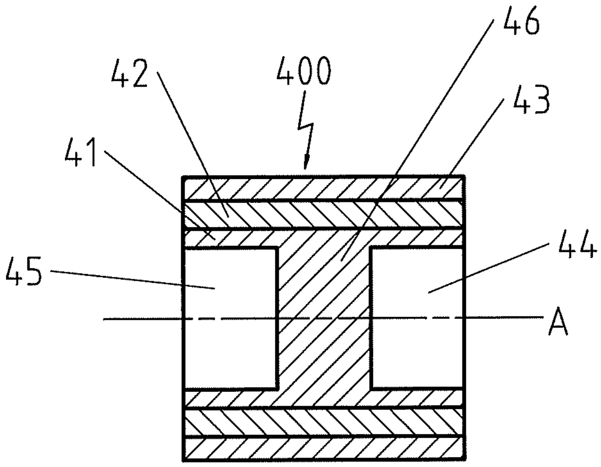
FIG. 4*a* is a cross-sectional view of a first additional example of a mineral-insulated socket that can be produced with an embodiment of the process.
Figure 4B:
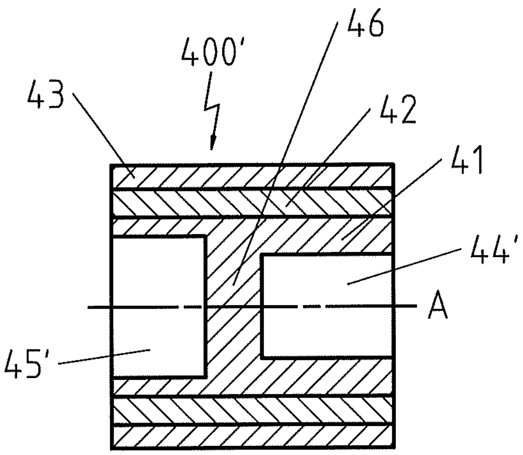
FIG. 4*b* is a cross-sectional view of a second additional example of a mineral-insulated socket that can be produced with an embodiment of the process.
Figure 4C:
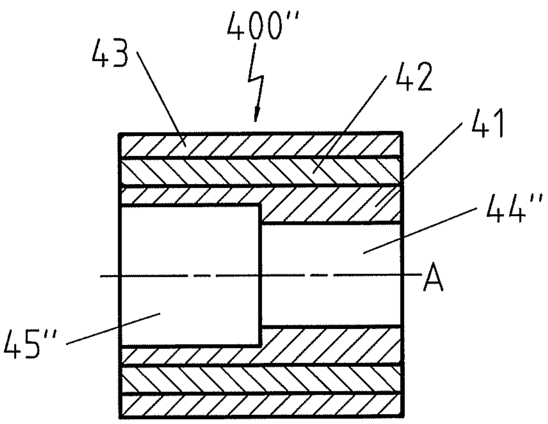
FIG. 4*c* is a cross-sectional view of a third additional example of a mineral-insulated socket that can be produced with an embodiment of the process.

Starting from such a mineral-insulated socket 100, for example the mineral-insulated sockets 400, 400', and 400" shown in FIGS. 4*a* to 4*c* can be produced with metallic inner part 41, electrically insulating material 42, and metallic outer pipe 43. For this purpose, additional openings 44, 44', 44" and 45, 45', 45" are formed from the end side in the metallic inner part 11 and 41, respectively, to produce sockets 400, 400', 400", which can bear additional components of the feedthrough, wherein these are separated from each other by a separating wall 46, 46' in the embodiments of FIGS. 4*a* and 4*b*.

Figures 1E, 1F:
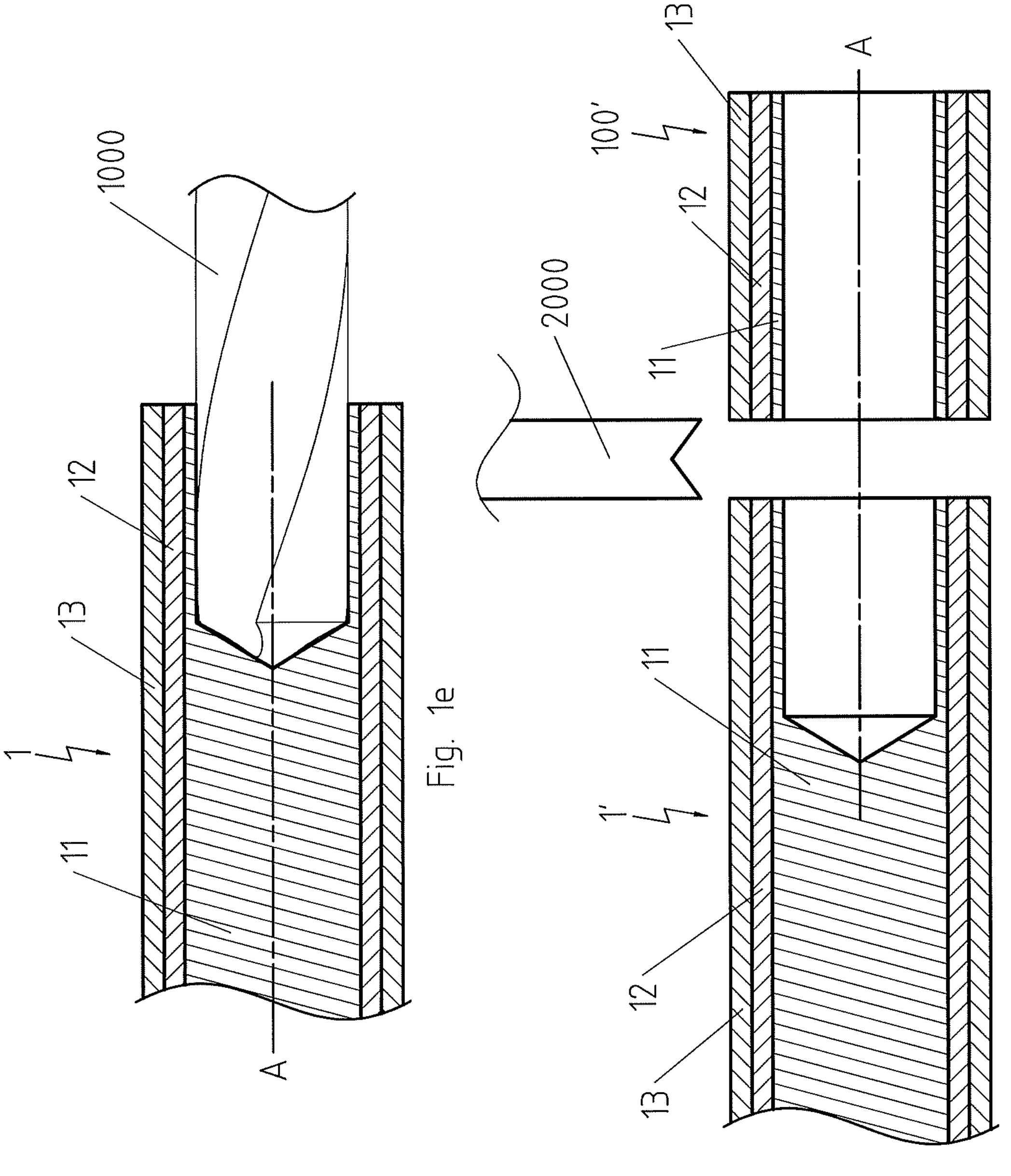
FIG. 1*e* is a cross-sectional view taken along the center axis A of the mineral insulated socket of FIG. 1 related to an optional additional step in the processing of the second intermediate stage of FIG. 1*c*.
FIG. 1*f* is a cross-sectional view taken along the center axis A of the mineral insulated socket of FIG. 1 after completion of the mineral-insulated socket in a second variant of the first embodiment of the process.

Alternatively, at first the bar stock material 1 can also be further processed, for example, as shown in FIG. 1*e*, by the formation of an opening into the metallic inner part 11 from the end side of the bar stock material 1, which can be done, for example, with the drill 1000.

If a section of the bar stock material 1, as shown in FIG. 1*f*, is then cut with a tool 2000, whose length is less than the depth of the opening, a tubular, mineral-insulated socket 100' can be produced. It is also possible, however, to cut a section with a larger length than the depth of the opening, which then leads to a mineral-insulated socket with a blind hole.

Figure 2A:
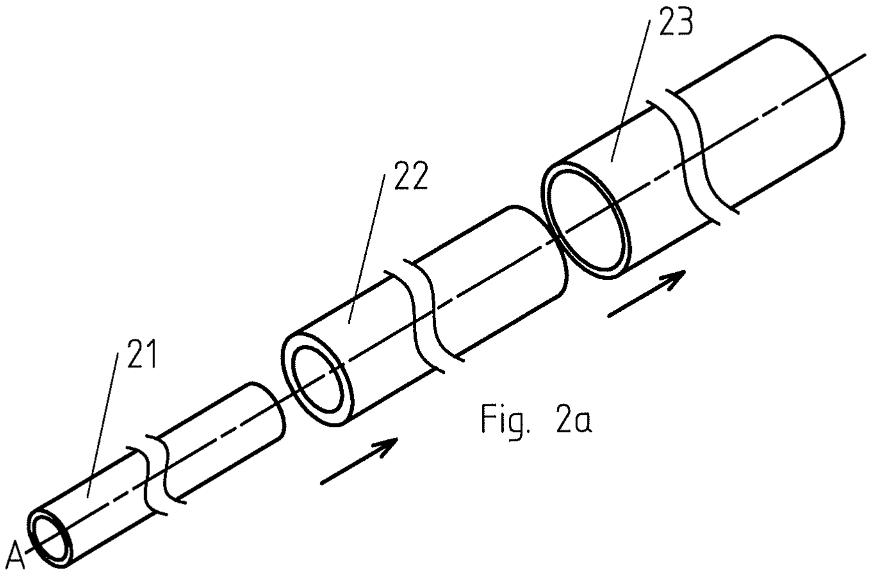
FIG. 2*a* is a side perspective, partial fragmentary view of a step of a second embodiment of the process for the manufacture of a mineral-insulated socket.
Figure 2B:
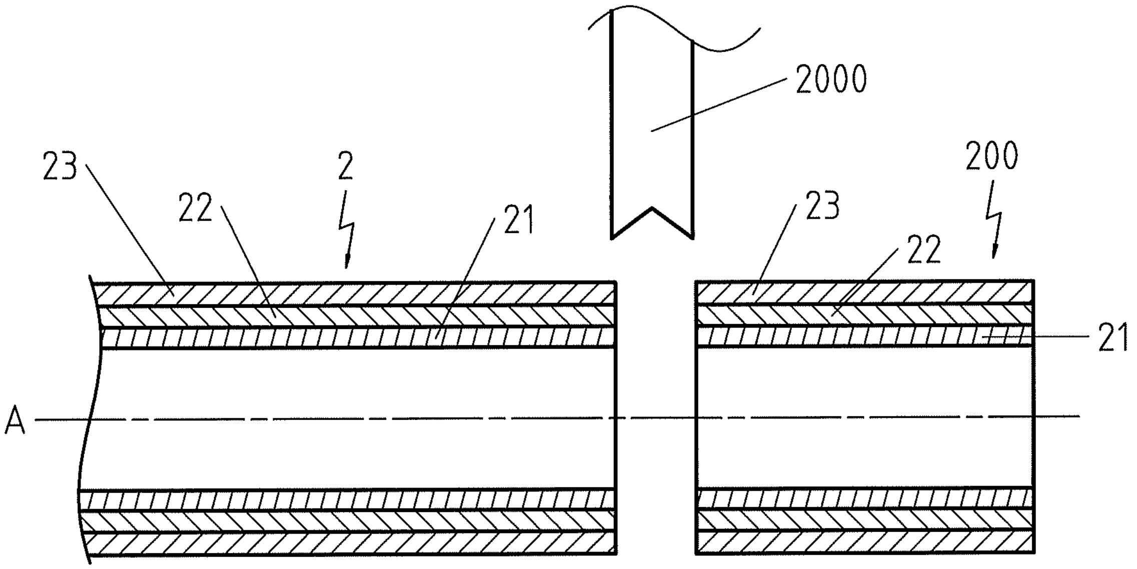
FIG. 2*b* is a cross-sectional view taken along a center axis A of the mineral insulated socket of FIG. 2*a* after completion of the mineral-insulated socket in the second embodiment of the process.

A second embodiment of the process, to which FIGS. 2*a* and 2*b* relate, differs from the first embodiment, as can be seen in FIG. 2*a* in that here, a tubular metallic inner part 21 is pushed into the electrically insulating material 22 provided as a tubular body and the outer pipe 23. The bar stock material 2 produced by the compression process can then be cut again with a tool 2000, as shown in FIG. 2*b*, so that a tubular mineral-insulated socket 20 is produced directly.

Figure 3A:
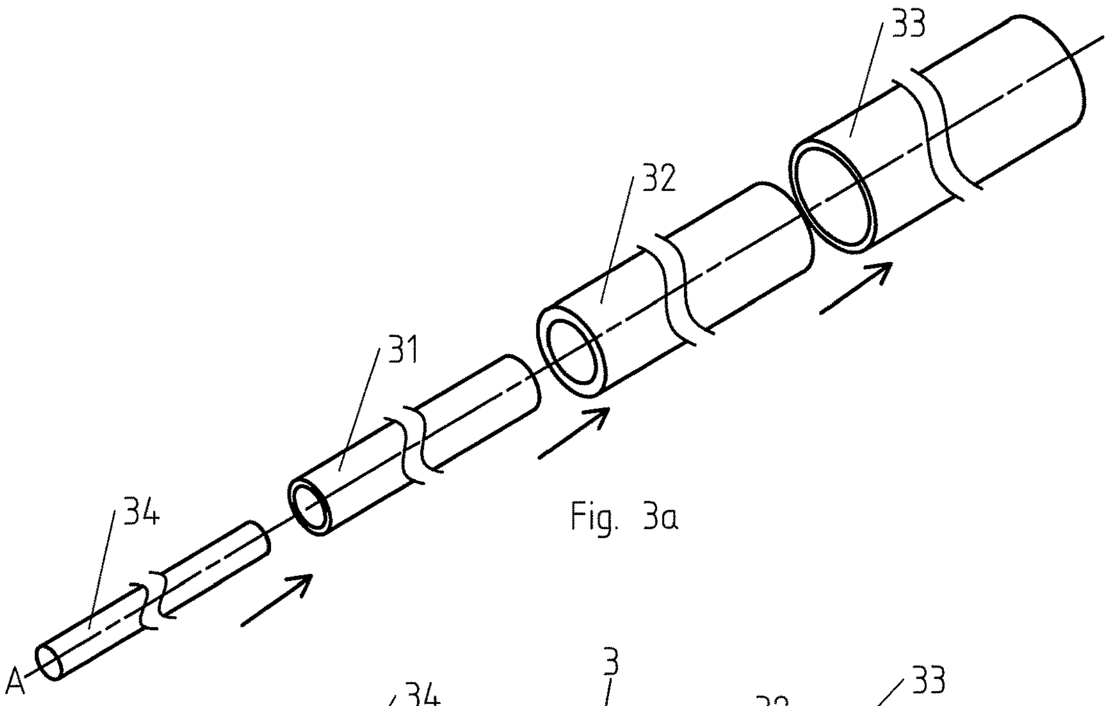
FIG. 3*a* is a side perspective, partial fragmentary view of a step of a third embodiment of the process for the manufacture of a mineral-insulated socket.
Figure 3B:
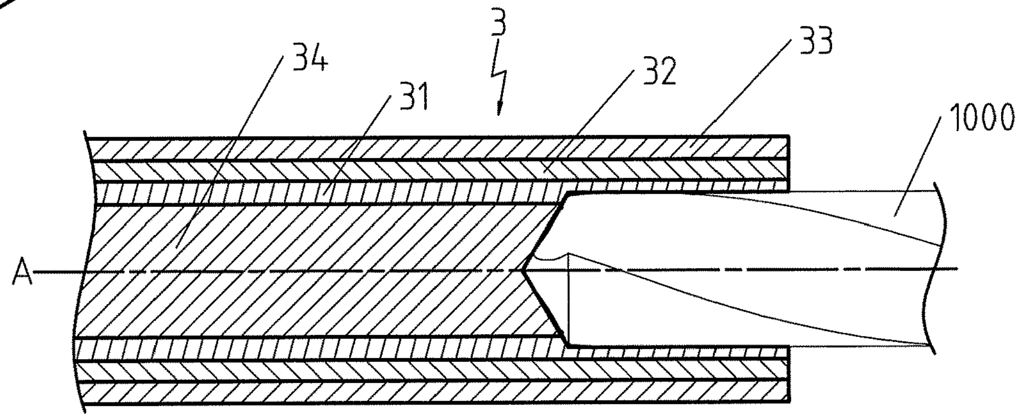
FIG. 3*b* is a cross-sectional view taken along a center axis A of the mineral insulated socket of FIG. 3*a* in an intermediate stage in the third embodiment of the process for the manufacture of a mineral-insulated socket.
Figure 3C:
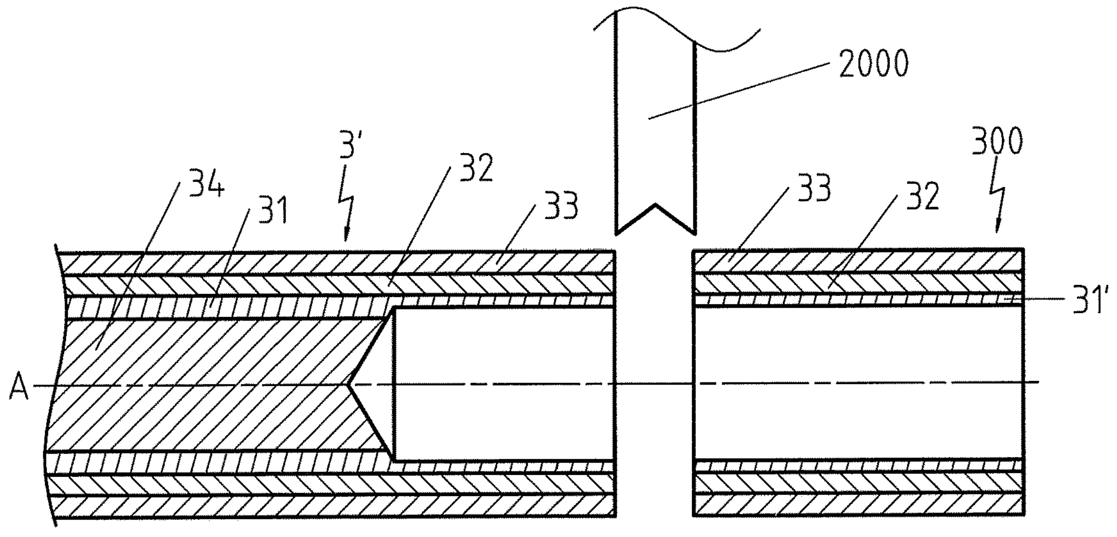
FIG. 3*c* is a cross-sectional view taken along the center axis of the mineral insulated socket of FIG. 3*a* after completion of the mineral-insulated socket in the third embodiment of the process.

A third embodiment of the process to which FIGS. 3*a* to 3*c* relate differs from the second embodiment, as can be seen in FIG. 3*a*, in that here, a core 34, which stabilizes the tubular metallic inner part during the compression process, is inserted into the tubular metallic inner part 31, which is pushed into the electrically insulating material 32 provided as a tubular body and the outer pipe 33. This core can then be drilled out at least in some sections with a drill 1000 from the bar stock material 3 produced by the compression process, as shown in FIG. 3*b*, before the socket 30 is separated with a tool 2000, as shown in FIG. 3*c*.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

LIST OF REFERENCE SYMBOLS

1, 2, 3 Bar stock material
11, 21, 31, 41 Metallic inner part
12, 22, 32, 42 Electrically insulating material
13, 23, 33, 43 Outer pipe
34 Core
44, 44', 44", 45, 45', 45" Opening
46, 46' Separating wall
100, 100', 200, 300,
400, 400', 400" Electrical feedthrough
1000 Drill
2000 Tool
A Center axis

The invention claimed is:

1. A process for manufacturing a mineral-insulated socket for a module of an electrical feedthrough of an exhaust gas duct of a motor vehicle, the mineral-insulated socket comprising:

a metallic inner part arranged in a metallic outer pipe and electrically insulated from the metallic outer pipe by an electrically insulating mineral material, the metallic inner part comprised of a pipe, characterized in that, in a process of constructing the mineral-insulated socket, in one step the metallic inner part, the electrically insulating material, and the outer pipe are compressed to form a composite and in a subsequent step the mineral-insulated socket is produced by removing at least one complete section of the compressed composite, the pipe being filled with a core during the compression, the core being removed after the compression of the composite.

2. The process according to claim 1, wherein the composite is a bar stock material.

3. The process according to claim 1, wherein the metallic inner part used for the manufacture of the compressed composite is solid.

4. The process according to claim 1, wherein parts of the outer pipe of the mineral-insulated socket are removed, so that the outer pipe has multiple outer pipe sections electrically insulated from each other.

5. A process for manufacturing a mineral-insulated socket for a module of an electrical feedthrough of an exhaust gas duct of a motor vehicle, the mineral-insulated socket comprising:

a metallic inner part arranged in a metallic outer pipe and electrically insulated from the metallic outer pipe by an electrically insulating mineral material, characterized in that, in a process of constructing the mineral-insulated socket, in one step the metallic inner part, the electrically insulating material, and the outer pipe are compressed to form a composite and in a subsequent step the mineral-insulated socket is produced by removing at least one complete section of the compressed composite, the process further includes the step of forming an opening in the metallic inner part, the opening being formed in the metallic inner part before the removal step, wherein the opening is formed as a blind hole in the metallic inner part.

6. The process according to claim 5, wherein the opening is formed in the metallic inner part such that the opening completely penetrates through the metallic inner part.

7. The process according to claim 5, wherein an additional opening is formed in the metallic inner part from an opposite side relative to the opening, such that a separating wall remains in the metallic inner part between the opening and the additional opening.

8. The process according to claim 5, wherein the opening is formed concentric to a pipe center axis of the outer pipe.

* * * * *